US012780661B2

(12) United States Patent
Cheng et al.

(10) Patent No.: US 12,780,661 B2
(45) Date of Patent: Nov. 3, 2026

(54) LITHIUM IRON PHOSPHATE LITHIUM-RICH OXIDE COMPOSITE, PREPARATION METHOD THEREFOR AND USE THEREOF

(71) Applicant: HUBEI RT ADVANCED MATERIALS GROUP COMPANY LIMITED, Huangshi (CN)

(72) Inventors: guangchun Cheng, Huangshi (CN); jie Sun, Huangshi (CN); zhonglin He, Huangshi (CN)

(73) Assignee: HUBEI RT ADVANCED MATERIALS GROUP COMPANY LIMITED, Huangshi (CN)

( * ) Notice: Subject to any disclaimer, the term of this patent is extended or adjusted under 35 U.S.C. 154(b) by 711 days.

(21) Appl. No.: 18/251,532

(22) PCT Filed: Dec. 31, 2020

(86) PCT No.: PCT/CN2020/142036
§ 371 (c)(1),
(2) Date: May 2, 2023

(87) PCT Pub. No.: WO2022/088495
PCT Pub. Date: May 5, 2022

(65) Prior Publication Data

US 2024/0124306 A1 Apr. 18, 2024

(30) Foreign Application Priority Data

Oct. 28, 2020 (CN) ......................... 202011171827.0

(51) Int. Cl.

| | |
|---|---|
| ***H01M 10/0525*** | (2010.01) |
| ***C01B 25/45*** | (2006.01) |
| ***C01G 51/00*** | (2025.01) |
| ***C01G 51/42*** | (2025.01) |
| ***H01M 4/131*** | (2010.01) |

(52) U.S. Cl.
CPC .............. *C01B 25/45* (2013.01); *C01G 51/42* (2013.01); *C01P 2006/40* (2013.01)

(58) Field of Classification Search
CPC ..... C01B 25/45; C01G 51/42; C01P 2006/40; H01M 4/0404; H01M 4/131; H01M 4/136; H01M 4/1391; H01M 4/364; H01M 4/485; H01M 4/525; H01M 4/5825; H01M 10/0525; H01M 10/54; H01M 4/1397; H01M 2004/028; H01M 4/362; H01M 4/13; Y02E 60/10
See application file for complete search history.

(56) References Cited

U.S. PATENT DOCUMENTS

| | | | | |
|---|---|---|---|---|
| 2013/0171524 | A1 | 7/2013 | Cho et al. | |
| 2014/0120378 | A1 | 5/2014 | Mun et al. | |
| 2016/0372784 | A1 * | 12/2016 | Hayner | H01M 4/131 |
| 2019/0013516 | A1 * | 1/2019 | Herle | C23C 14/14 |

FOREIGN PATENT DOCUMENTS

| | | | | |
|---|---|---|---|---|
| CN | 101147281 | Y | | 3/2008 |
| CN | 101188293 | A | * | 5/2008 |
| CN | 109390563 | Y | | 2/2019 |
| CN | 110224169 | A | | 9/2019 |
| CN | 111769288 | Y | | 10/2020 |

OTHER PUBLICATIONS

SR of PCT/CN2020/142036.

* cited by examiner

*Primary Examiner* — Muhammad S Siddiquee
(74) *Attorney, Agent, or Firm* — Hemisphere Law, PLLC

(57) ABSTRACT

The present disclosure relates to the field of lithium ion batteries, and discloses a lithium iron phosphate lithium-rich oxide composite, a preparation method therefor and use thereof. The method comprises: (1) mechanically fusing $LiFePO_4$ with a lithium-rich oxide in a protective gas atmosphere, wherein the weight ratio of the $LiFePO_4$ to the lithium-rich oxide is 100:2-15; and (2) sequentially sieving and demagnetizing the obtained mechanically fused material to obtain the lithium iron phosphate lithium-rich oxide composite. In the method provided by the present disclosure, by mechanically fusing a specific amount of lithium-rich oxide with $LiFePO_4$, the lithium iron phosphate lithium-rich oxide composite is obtained, and the electrochemical performance of a $LiFePO_4$ lithium ion battery is improved.

10 Claims, 4 Drawing Sheets

LITHIUM IRON PHOSPHATE LITHIUM-RICH OXIDE COMPOSITE, PREPARATION METHOD THEREFOR AND USE THEREOF

CROSS-REFERENCE TO RELATED APPLICATION

This patent application claims the benefit and priority of Chinese Patent Application No. 202011171827.0 filed with the China National Intellectual Property Administration on 28 Oct. 2020, the disclosure of which is incorporated by reference herein in its entirety as part of the present application.

TECHNICAL FIELD

The present disclosure relates to the field of lithium ion batteries, particularly to a lithium iron phosphate lithium-rich oxide composite, a preparation method therefor and use thereof.

BACKGROUND

A commercial lithium ion battery has the characteristics of high energy density, high working voltage, long cycle life, no memory effect, little environment pollution and the like, is broadly applied to the fields of electronic products, power batteries and energy storage, and its application range is increasingly broadened and involves various aspects of life. The positive electrode material of the lithium ion battery is one of core materials of the lithium ion battery, and its cost accounts for about 30% of battery cost. Meanwhile, the positive electrode material directly affects the energy density of the lithium ion battery and decides the comprehensive performance of the lithium ion battery.

Since Mr Goodenough reported for the first time that a lithium iron phosphate ($LiFePO_4$) material with an olivine-shaped structure had a de-insertion lithium function in 1997, $LiFePO_4$ have attracted attentions from academia and industry. The defects of poor intrinsic conductivity of $LiFePO_4$ are overcome by using a carbon coating and ion doping technology, and the defects of slow lithium ion diffusing rate and the like of $LiFePO_4$ are overcome through nano sizing or other technologies, so that the performance of $LiFePO_4$ is significantly improved. $LiFePO_4$ has become one of positive electrode materials of the current mainstream lithium ion batteries.

With continuous improvement of requirements on comprehensive performances of $LiFePO_4$, such as specific capacity, compact density, rate capability, cycle life and bill of material (BOM) cost, the specific capacity of $LiFePO_4$ has been close to a theoretical specific capacity limit by using the existing technology. Therefore, how to improve the specific capacity and energy density of the $LiFePO_4$ lithium ion battery becomes an urgent problem.

SUMMARY

In order to overcome the defects in the prior art that the specific capacity of the $LiFePO_4$ material has been close to the theoretical specific capacity limit and cannot be further improved, the objective of the present disclosure is to provide a lithium iron phosphate lithium-rich oxide composite to improve the specific capacity and energy density of the $LiFePO_4$ lithium ion battery.

To achieve the above objective, the first aspect of the present disclosure provides a method for preparing a lithium iron phosphate lithium-rich oxide composite, the method comprising:

(1) mechanically fusing $LiFePO_4$ with a lithium-rich oxide in a protective gas atmosphere, wherein a weight ratio of the $LiFePO_4$ to the lithium-rich oxide is 100:2-15; and (2) sequentially sieving and demagnetizing the obtained mechanically fused material to obtain the lithium iron phosphate lithium-rich oxide composite.

The second aspect of the present disclosure provides a lithium iron phosphate lithium-rich oxide composite prepared by the above method.

The third aspect of the present disclosure provides a lithium iron phosphate lithium-rich oxide composite, the composite comprising lithium iron phosphate and a lithium-rich oxide;

wherein, a content weight ratio of the lithium iron phosphate to the lithium-rich oxide is 100:2-15.

The fourth aspect of the present disclosure provides use of the above lithium iron phosphate lithium-rich oxide composite in lithium ion batteries.

The fifth aspect of the present disclosure provides a method for preparing a positive electrode plate of a lithium ion battery, the method comprising (a) mechanically fusing $LiFePO_4$ with a lithium-rich oxide in a protective gas atmosphere, wherein a weight ratio of the $LiFePO_4$ to the lithium-rich oxide is 100:2-15;

(b) sequentially sieving and demagnetizing the obtained mechanically fused material to obtain the lithium iron phosphate lithium-rich oxide composite;

(c) mixing the lithium iron phosphate lithium-rich oxide composite, a conductive agent and a binder in the presence of a solvent to obtain positive electrode slurry; and (d) coating the positive electrode slurry onto a current collector foil, and then drying, so as to obtain the positive electrode plate of the lithium ion battery.

The sixth aspect of the present disclosure provides a lithium ion battery comprising the positive electrode plate of the lithium ion battery prepared by the above method.

Compared with the prior art, the present disclosure at least has the following advantages:

In the method provided by the present disclosure, by mechanically fusing a specific proportion of lithium-rich oxide with $LiFePO_4$, the lithium iron phosphate lithium-rich oxide composite is obtained, and the specific capacity and energy density of the $LiFePO_4$ lithium ion battery are improved. Meanwhile, the method is simple in preparation process, few of types of used raw materials and saved in production cost.

DETAILED DESCRIPTION OF THE EMBODIMENTS

Figure 1:
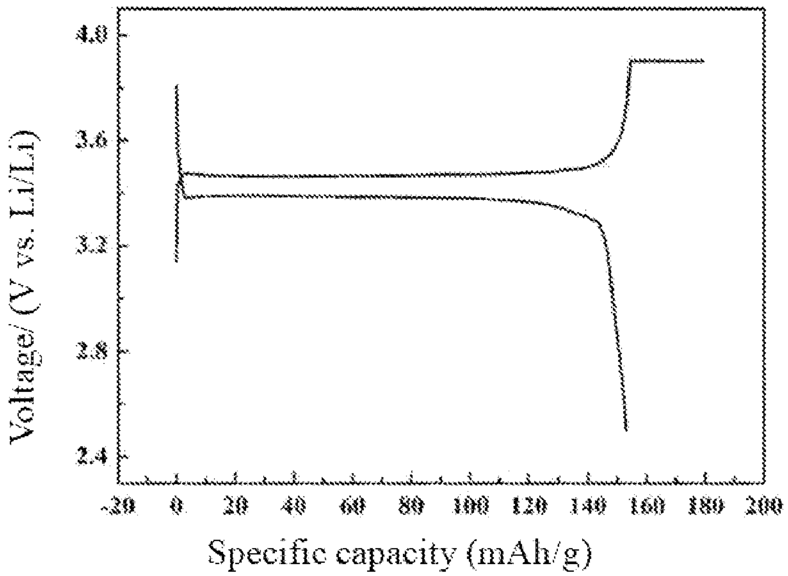
FIG. 1 is a charge-discharge curve of a button type half battery prepared from a lithium iron phosphate lithium-rich oxide composite in example 1.

Next, specific embodiments of the present disclosure will be described in detail in combination with accompanying drawings. It should be understood that the specific embodiments described here are only for illustrating and explaining the present disclosure but not intended to limit the present disclosure.

End points of the ranges disclosed herein and any values are all not limited to the precise ranges or values, these ranges or values should be understood as containing values close to these ranges or values. For numerical ranges, the end point values of each range, the end point values and separate point values of each range and separate end point values can be combined with each other to obtain one or more new numerical ranges, and these numerical ranges should be deemed as being specifically disclosed herein.

As described above, the first aspect of the present disclosure provides a method for preparing a lithium iron phosphate lithium-rich oxide composite, the method comprising:

(1) mechanically fusing $LiFePO_4$ with a lithium-rich oxide in a protective gas atmosphere, wherein a weight ratio of the $LiFePO_4$ to the lithium-rich oxide is 100: 2-15; and (2) sequentially sieving and demagnetizing the obtained mechanically fused material to obtain the lithium iron phosphate lithium-rich oxide composite.

According to the method of the present disclosure, a specific proportion of lithium-rich oxide is mechanically fused with $LiFePO_4$ to obtain the lithium iron phosphate lithium-rich oxide composite. The two oxides of the lithium iron phosphate lithium-rich oxide composite are well combined, and the compounding of lithium iron phosphate and the lithium-rich oxide composite does not affect the crystal structure of lithium iron phosphate; the compounded lithium-rich oxide can provide redundant active lithium ions for lithium iron phosphate, which makes up the loss of active lithium during the charge and discharge for the first time, thereby improving the specific capacity and energy density of the lithium ion battery.

According to the present disclosure, there are no specific limitations on manners for mechanically fusing the $LiFePO_4$ with the lithium-rich oxide and devices used for mechanically fusing, as long as the existing physical processing methods are adopted, and the composite having excellent electrochemical performance can be obtained.

According to a preferred embodiment of the present disclosure, in step (1), the $LiFePO_4$ is mechanically fused with the lithium-rich oxide in an efficient fusing machine.

According to the present disclosure, there are no specific limitations on the sources of the $LiFePO_4$, $LiFePO_4$ can be prepared commercially, or by the existing methods for preparing $LiFePO_4$ in the art such as a ferrous oxalate process, an iron red process, an iron phosphate process and a liquid phase process; furthermore, the $LiFePO_4$ can be of a high capacity type, a high compact type, a high magnification type, a long service life type, etc., which is not specially limited.

According to the present disclosure, the lithium-rich oxide refers to an oxide where the molar number of lithium is greater than 1 in unit molecular weight.

Preferably, the lithium-rich oxide is $Li_5FeO_4$ and/or $Li_6CoO_4$, still further preferably $Li_6CoO_4$. The inventor finds that $Li_5FeO_4$ and/or $Li_6CoO_4$ is specially selected, especially $Li_6CoO_4$ is selected to be mechanically fused with $LiFePO_4$, the obtained lithium iron phosphate lithium-rich oxide composite has better electrochemical performance such as specific capacity.

According to the present disclosure, there are no specific limitations on sources of the lithium-rich oxides such as $Li_5FeO_4$ and $Li_6CoO_4$, they can be commercial products, or by the existing methods for preparing $Li_5FeO_4$ and $Li_6CoO_4$ in the art, as long as the lithium iron phosphate lithium-rich oxide composite having high specific capacity is obtained by mechanically fusing the lithium-rich oxide with $LiFePO_4$.

According to the present disclosure, to obtain the lithium iron phosphate lithium-rich oxide composite having excellent electrochemical performance, it is needed to control the weight ratio of $LiFePO_4$ to the lithium-rich oxide to be in a range of 100:2-15. In specific embodiments, the weight ratio of the $LiFePO_4$ to the lithium-rich oxide is for example 100:2, 100:3, 100:4, 100:5, 100:6, 100:7, 100:8, 100:9, 100:10, 100:11, 100:12, 100:13, 100:14, 100:15, and any value in a range composed of any two of these point values.

To obtain the lithium iron phosphate lithium-rich oxide composite having excellent electrochemical performance, the weight ratio of the $LiFePO_4$ to the lithium-rich oxide is 100:2-10.

Preferably, in step (1), the conditions for the mechanically fusing comprise: the fusing rate is 300-2500 rpm, and the fusing time is 3-60 min. Where, the fusing rate is 300-2500 rpm, for example 500 rpm, 600 rpm, 700 rpm, 800 rpm, 900 rpm, 1000 rpm, 110 rpm, 1200 rpm, 1300 rpm, 1400 rpm, 1500 rpm, 1600 rpm, 1700 rpm, 1800 rpm, 1900 rpm, 2000 rpm, 2100 rpm, 2200 rpm, 2300 rpm, 2400 rpm or 2500 rpm; the fusing time is 3-60 min, for example 5 min, 10 min, 15 min, 20 min, 25 min, 30 min, 35 min, 40 min, 45 min, 50 min, 55 min or 60 min.

Preferably, in step (1), when $LiFePO_4$ is mechanically fused with the lithium-rich oxide, the fusing rate is 1000-1500 rpm, and the fusing time is 10-30 min.

According to the method of the present disclosure, the protective gas can be various gases capable of providing the protective atmosphere, which are currently used in the art.

Preferably, in step (1), the protective gas is nitrogen and/or an inert gas;

More preferably, in step (1), the protective gas is nitrogen and/or argon.

Preferably, in step (2), the sieving is vibratory sieving, and the mesh number of a screen for the vibratory sieving is 200-500 meshes, for example 200 meshes, 250 meshes, 300 meshes, 350 meshes, 400 meshes, 450 meshes or 500 meshes.

More preferably, the mesh number of the sieving is 300 meshes, and the products under the screen are taken.

Preferably, in step (2), the magnetic force of an iron remover for the demagnetizing is 5000-12000 GS, for example 50000 GS, 5500 GS, 6000 GS, 6500 GS, 7000 GS, 7500 GS, 8000 GS, 8500 GS, 9000 GS, 9500 GS, 10000 GS, 10500 GS, 11000 GS, 11500 GS or 12000 GS.

More preferably, in step (2), the magnetic force of an iron remover for the demagnetizing is 8000-10000 GS.

As described above, the third aspect of the present disclosure provides a lithium iron phosphate lithium-rich oxide composite which contains lithium iron phosphate and a lithium-rich oxide;

wherein, the content weight ratio of the lithium iron phosphate to the lithium-rich oxide is 100:2-15.

In the third aspect of the present disclosure, preferably, the lithium-rich oxide is $Li_5FeO_4$ and/or $Li_6CoO_4$, more preferably $Li_6CoO_4$.

In the third aspect of the present disclosure, preferably, the weight ratio of the $LiFePO_4$ to the lithium-rich oxide is 100:2-10.

The phosphate lithium-rich oxide composite provided by the present disclosure contains lithium iron phosphate and the lithium-rich oxide which are well combined. The phosphate lithium-rich oxide composite has excellent electrochemical performance, such as high specific capacity and high energy density.

As described above, the fourth aspect of the present disclosure provides use of the above lithium iron phosphate lithium-rich oxide composite in lithium ion batteries.

In the present disclosure, there are no specific limitations on specific operations of the use, for example the lithium iron phosphate lithium-rich oxide composite is used as a positive electrode active substance to prepare a positive electrode plate so as to obtain the lithium ion battery, etc.

As described above, the fifth aspect of the present disclosure provides a method for preparing a positive electrode plate of a lithium ion battery, the method comprising:

(a) mechanically fusing $LiFePO_4$ with a lithium-rich oxide in a protective gas atmosphere, wherein a weight ratio of the $LiFePO_4$ to the lithium-rich oxide is 100:2-15;

(b) sequentially sieving and demagnetizing the obtained mechanically fused material to obtain the lithium iron phosphate lithium-rich oxide composite;

(c) mixing the lithium iron phosphate lithium-rich oxide composite, a conductive agent and a binder in the presence of a solvent to obtain positive electrode slurry; and (d) coating the positive electrode slurry onto a current collector foil, and then drying, so as to obtain the positive electrode plate of the lithium ion battery.

In the fifth aspect of the present disclosure, preferred specific embodiments in step (a) and step (b), such as type selection of lithium-rich oxides, the weight ratio of $LiFePO_4$ to the lithium-rich oxide, the conditions of the mechanically fusing and the conditions for the sieving and demagnetizing, are the same as those in step (1) and step (2) of the method in the above first aspect, which are not illustrated in details for avoiding repetition.

In the fifth aspect of the present disclosure, the obtained lithium iron phosphate lithium-rich oxide composite has the same property as that of the above lithium iron phosphate lithium-rich oxide composite, it is not repeated herein.

In the fifth aspect of the present disclosure, the conductive agent is selected from at least one of Super-P (SP), acetylene black, KS-6 and carbon nano tubes.

In the fifth aspect of the present disclosure, the binder is selected from polytetrafluoroethylene, polyvinylidene fluoride and butadiene styrene rubber.

In the fifth aspect of the present disclosure, based on the total weight of the lithium iron phosphate lithium-rich oxide composite, the conductive agent and the binder, the content of the lithium iron phosphate lithium-rich oxide composite is 80-90 wt %, the content of the conductive agent is 5-10 wt %, and the content of the binder is 5-10 wt %.

In the fifth aspect of the present disclosure, the solvent includes but is not limited to at least one of N-methylpyrrolidone, N,N-dimethylformamide, N,N-diethylformamide, dimethyl sulfoxide, tetrahydrofuran and an alcohol dispersant.

Preferably, in the positive electrode slurry, the use of the solvent makes the solid content of the positive electrode slurry be 35-45 wt %, the solid content refers to the total weight of the lithium iron phosphate lithium-rich oxide composite, the conductive agent and the binder.

In the fifth aspect of the present disclosure, preferably, in step (c), the condition of the mixing includes a temperature of 25±2° C., and the mixing is carried out under the condition of stirring.

In the fifth aspect of the present disclosure, preferably, in step (d), the positive electrode slurry is coated onto current collector foil, and the face density (load amount) of the lithium iron phosphate lithium-rich oxide composite is 8.5-9.5 mg/cm$^2$.

Preferably, the current collector foil is aluminum foil.

In the fifth aspect of the present disclosure, in step (d), the specific operation for coating is not specially limited, which can be carried out by using the existing coating operation for preparing an electrode plate in the art.

In the fifth aspect of the present disclosure, in step (d), the specific condition for drying is not specially limited, as long as the electrode plate can be completely dried.

As described above, the sixth aspect of the present disclosure provides a lithium ion battery comprising the positive electrode plate of the lithium ion battery prepared by the above method according to the fifth aspect of the present disclosure.

Next, the present disclosure will be described in detail through examples and comparative examples, but the protective scope of the present disclosure is not limited thereto.

Unless otherwise specified, all raw materials used are commercially available.

$LiFePO_4$, $Li_5FePO_4$ and $Li_6CoO_4$ used in examples and comparative examples of the present disclosure are all purchased from Hubei Rongtong Hi-Tech Advanced Materials Co., Ltd

Example 1

(1) 300 g of $LiFePO_4$ and 9 g of $Li_5FeO_4$ were weighed and put into an efficient fusing machine cavity to be mechanically fused for 15 min under the protection of nitrogen, wherein the rotation speed of a main shaft was adjusted to 1000 rpm, so that two metal oxides were mechanically fused in a manner of physical processing;

(2) the obtained mechanically fused material was sieved via a 325-mesh screen and demagnetized by using an iron remover with a magnetic force of 10000 GS to obtain a lithium iron phosphate lithium-rich oxide composite L1.

Example 2

(1) 300 g of $LiFePO_4$ and 15 g of $Li_5FeO_4$ were weighed and put into an efficient fusing machine cavity to be mechanically fused for 20 min under the protection of nitrogen, wherein the rotation speed of a main shaft was adjusted to 1200 rpm, so that two metal oxides were mechanically fused in a manner of physical processing;

(2) the obtained mechanically fused material was sieved via a 300-mesh sieve and demagnetized by using an iron remover with a magnetic force of 8000 GS to obtain a lithium iron phosphate lithium-rich oxide composite L2.

Example 3A (1) 300 g of $LiFePO_4$ and 9 g of $Li_5CoO_4$ were weighed and put into an efficient fusing machine cavity to be mechanically fused for 30 min under the protection of nitrogen, wherein the rotation speed of a main shaft was adjusted to 1200 rpm, so that two metal oxides were mechanically fused in a manner of physical processing;

(2) the obtained mechanically fused material was sieved via a 325-mesh sieve and demagnetized by using an iron remover with a magnetic force of 9000 GS to obtain a lithium iron phosphate lithium-rich oxide composite L3A.

Example 3B

The method in this example is the same as that in example 1 except that the equal weight of $Li_6CoO_4$ is used to replace $Li_5FeO_4$ in example 1, the rest is the same as that in example 1, and a lithium iron phosphate lithium-rich oxide composite L3B is obtained.

Example 4

The method in this example is the same as that in example 3A except that 300 g of $LiFePO_4$ and 45 g of $Li_6CoO_4$ are respectively weighed to be put into the efficiency fusing machine cavity for mechanically fusing.

The rest is the same as that in example 3A, and a lithium iron phosphate lithium-rich oxide composite L4 is obtained.

Example 5

The method in this example is the same as that in example 3A except that the rotation speed of the main shaft is adjusted to 500 rpm.

The rest is the same as that in example 3A, and a lithium iron phosphate lithium-rich oxide composite L5 is obtained.

Example 6

The method in this example is the same as that in example 3A except that the time of mechanically fusing is 5 min.

The rest is the same as that in example 3A, and a lithium iron phosphate lithium-rich oxide composite L6 is obtained.

Example 7

The method in this example is the same as that in example 3A except that the rotation speed of the main shaft is adjusted to 300 rpm.

The rest is the same as that in example 3A, and a lithium iron phosphate lithium-rich oxide composite L7 is obtained.

Example 8

The method in this example is the same as that in example 3A except that the time of mechanically fusing is 3 min.

The rest is the same as that in example 3A, and a lithium iron phosphate lithium-rich oxide composite L8 is obtained.

Comparative Example 1

Lithium iron phosphate $LiFePO_4$ was not treated, and directly used as a positive electrode active material subsequently.

Comparative Example 2

(1) 300 g of $LiFePO_4$ and 3 g of $Li_5FeO_4$ were weighed and put into an efficient fusing machine cavity to be mechanically fused for 5 min under the protection of nitrogen, wherein the rotation speed of a main shaft was adjusted to 1000 rpm, so that two metal oxides were mechanically fused in a manner of physical processing;

(2) the obtained mechanically fused material was sieved via a 200-mesh screen and demagnetized by using an iron remover with a magnetic force of 9000 GS to obtain a lithium iron phosphate lithium-rich oxide composite.

Comparative Example 3

The method in this example is the same as that in example 3A except that 300 g of $LiFePO_4$ and 1.5 g of $Li_6CoO_4$ are respectively weighed to be put into the efficiency fusing machine cavity for mechanically fusing.

The rest is the same as that in example 3A, and a lithium iron phosphate lithium-rich oxide composite is obtained.

Comparative Example 4

The method in this example is the same as that in example 3A except that 300 g of $LiFePO_4$ and 54 g of $Li_6CoO_4$ are respectively weighed to be put into the efficiency fusing machine cavity for mechanically fusing.

The rest is the same as that in example 3A, and a lithium iron phosphate lithium-rich oxide composite is obtained.

Test Example (1) X-ray diffraction (XRD) of the above iron phosphate lithium-rich oxide composites prepared in examples and comparative examples was tested. It can be seen by XRD test results that the iron phosphate lithium-rich oxide composite prepared in the present disclosure is obtained by compounding lithium iron phosphate with a lithium-rich oxide. Moreover, the compounding of lithium iron phosphate and lithium-rich oxide does not affect the crystal structure of lithium iron phosphate (2) Electrochemical performance test The above materials prepared in examples and comparative examples are prepared into lithium ion batteries, and their electrochemical performances are tested by using a Xinwei test system.

Test Example 1

The lithium iron phosphate lithium-rich oxide composite in example 1 is prepared into a lithium ion battery, and the electrochemical performance of the lithium ion battery is tested.

The Preparation Process of the Battery is as Follows:

Preparation of positive electrode plate: a lithium iron phosphate lithium-rich oxide composite L1, a conductive agent Super-P and polyvinylidene (PVDF) (purchased from SOLVY, model 5130) were evenly dispersed into a N-methylpyrrolidone (NMP) solvent (the solid content was 42 wt %) in a mass ratio of 90:5:5 via ball milling (the rotation speed was 1500 rpm, and the time was 20 min) and then coated on an aluminum foil (the loading amount of the lithium iron phosphate lithium-rich oxide composite L1 was 9.2 mg/cm$^2$), followed by vacuum drying, so as to obtain a positive electrode plate.

Assembling of button type half battery: a 2025 button type half battery was assembled by using the above positive electrode plate in a glove box filled with argon. Specially, a metal lithium sheet was used as a pair electrode, a diaphragm is a Celgard polypropylene membrane, an electrolyte was 1 mol/L $LiPF_6$/EC+DMC+EMC, wherein EC:DMC:EM=1:1:1 (volume ratio) so as to assemble the 2025 button type half battery.

Assembling of Button Type Full Battery

The above prepared positive electrode plate and a graphite negative electrode were assembled into a 2025 button type full battery, the N/P ratio of the full battery was 1.5, and the diaphragm and the electrolyte were the same as those of the above half battery.

Electrochemical Performance Test

Charge-discharge performance test: the test temperature was 25±2° C., the range of the test voltage was 2.5 V-3.9 V, and the charge-discharge ratio was 0.2 C;

The charge-discharge performances of the above half battery and full battery were respectively tested. Specific results are respectively seen in Table 1 and Table 2.

Test Examples 2-8

The methods in test examples 2-8 are the same as that in test example 1 except that the equal weights of the composites in examples 2-8 are respectively used to replace L1 in test example 1.

The rests are the same as those in test example 1. Specific test results are respectively seen in Table 1 and Table 2.

Comparative Test Examples 1-4

The methods in comparative test examples 1-4 are the same as that in test example 1 except that the equal weights of composites in comparative examples 1-4 are respectively used to replace L1 in test example 1

The rests are the same as those in test example 1. Specific test results are respectively seen in Table 1 and Table 2.

Comparative Test Example 5

Preparation of positive electrode plate: a lithium iron phosphate, $Li_5FeO_4$, a conductive agent Super-P and PVDF were evenly dispersed into an NMP solvent (the solid content was 42 wt %) in a mass ratio of 87:3:5:5 via ball milling (the rotation speed was 1500 rpm, and the time was 20 min) and then coated on an aluminum foil (the total loading amount of the lithium iron phosphate and $Li_5FePO_4$ was 9.2 mg/cm$^2$), followed by vacuum drying, so as to obtain a positive electrode plate.

Then, the button type half battery and full battery were prepared by using the same method as that in test example 1, and the electrochemical performances of the batteries were tested. Specific results are respectively seen in Table 1 and Table 2.

TABLE 1

Test results of button type half battery

| Test example number | Specific capacity for first charge (mAh/g) | Specific capacity for first discharge (mAh/g) |
|---|---|---|
| Test example 1 | 179.37 | 153.12 |
| Test example 2 | 182.47 | 154.26 |
| Test example 3A | 187.52 | 155.82 |
| Test example 3B | 185.79 | 154.02 |
| Test example 4 | 204.35 | 139.89 |
| Test example 5 | 181.62 | 152.39 |
| Test example 6 | 179.47 | 152.57 |
| Test example 7 | 179.78 | 151.35 |
| Test example 8 | 176.67 | 151.31 |
| Comparative test example 1 | 163.95 | 154.48 |
| Comparative test example 2 | 161.73 | 151.55 |
| Comparative test example3 | 165.87 | 152.72 |
| Comparative test example4 | 212.76 | 135.91 |
| Comparative test example 5 | 169.47 | 149.73 |

TABLE 2

Test results of button type full battery

| Test example number | Specific capacity for first charge (mAh/g) | Specific capacity for first discharge (mAh/g) |
|---|---|---|
| Test example 1 | 152.03 | 122.6 |
| Test example 2 | 175.99 | 142.02 |
| Test example 3A | 177.39 | 143.65 |
| Test example 3B | 173.96 | 140.39 |
| Test example 4 | 183.63 | 135.25 |
| Test example 5 | 173.73 | 140.82 |
| Test example 6 | 173.11 | 140.43 |
| Test example 7 | 171.76 | 140.83 |
| Test example 8 | 169.98 | 140.73 |
| Comparative test example 1 | 140.71 | 113.28 |
| Comparative test example 2 | 138.65 | 111.29 |
| Comparative test example3 | 148.52 | 116.75 |
| Comparative test example4 | 184.15 | 130.85 |
| Comparative test example 5 | 150.55 | 118.71 |

The present disclosure exemplarily provides a charge-discharge curve of a button type half battery prepared from a lithium iron phosphate lithium-rich oxide composite L1 prepared in example 1, as shown in FIG. 1. It can be seen that the specific capacities of the battery for first charge-discharge can be effectively improved by compounding a lithium-rich oxide with lithium iron phosphate.

Figure 2:
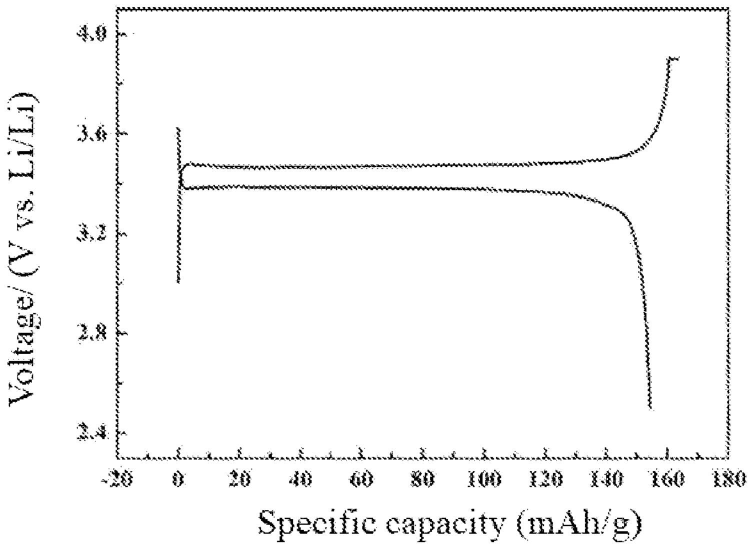
FIG. 2 is a charge-discharge curve of a button type half battery prepared from $LiFePO_4$ in comparative example 1.

The present disclosure exemplarily provides a curve of a button type half battery prepared from lithium iron phosphate $LiFePO_4$ in comparative example 1, as shown in FIG. 2. It can be seen from FIG. 2 that the specific capacity of lithium iron phosphate for first charge is about 163 mAh/g, and the specific capacity of first discharge is about 155 mAh/g.

Figure 3:
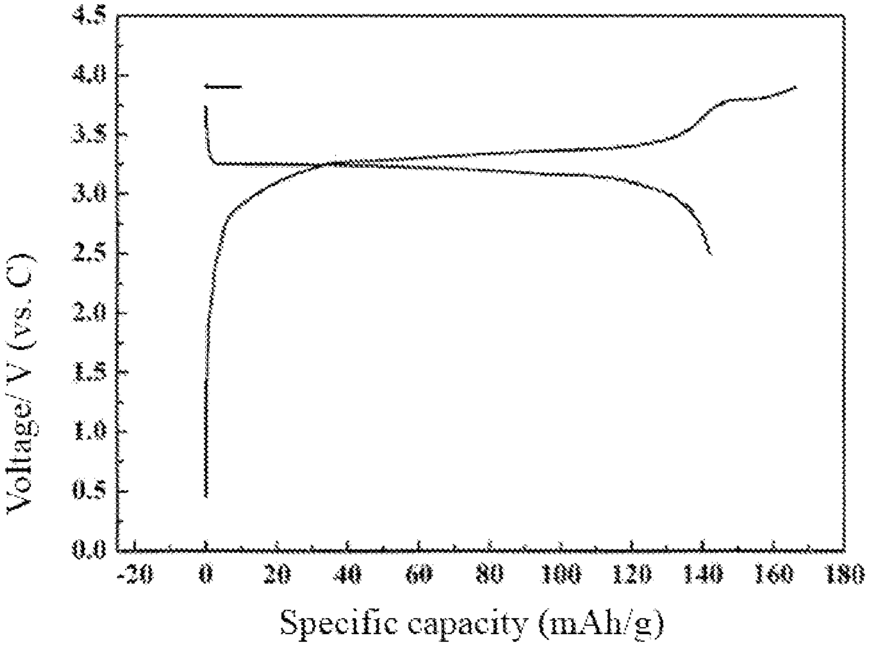
FIG. 3 is a charge-discharge curve of a button type full battery prepared from a lithium iron phosphate lithium-rich oxide composite in example 2.

The present disclosure exemplarily provides a charge-discharge curve of a button type full battery prepared from a lithium iron phosphate lithium-rich oxide composite in example 2, as shown in FIG. 3. It can be seen that the specific capacities of the lithium iron phosphate full battery for first charge-discharge can be effectively improved by compounding a lithium-rich oxide with lithium iron phosphate.

Figure 4:
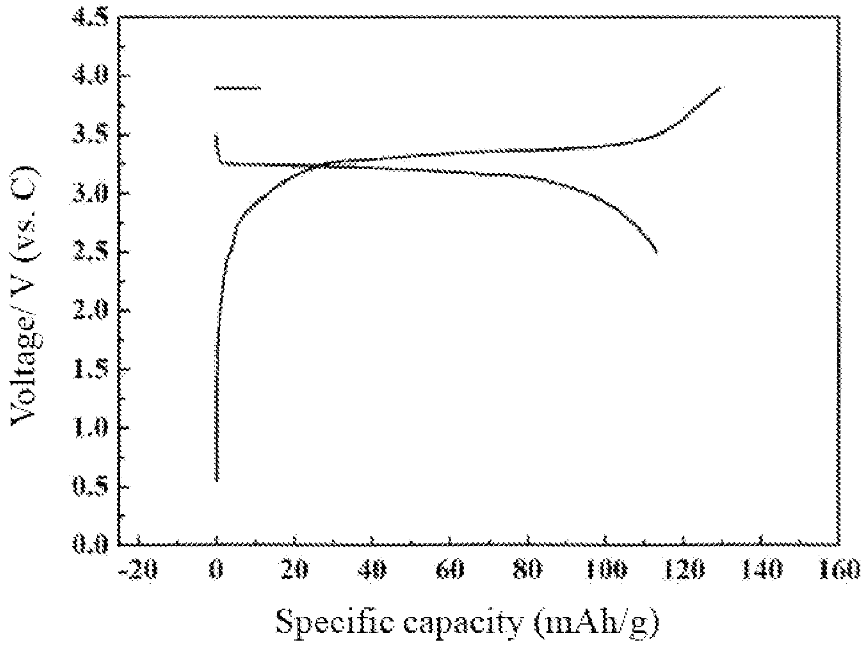
FIG. 4 is a charge-discharge curve of a button type full battery prepared from $LiFePO_4$ in comparative example 1.

The present disclosure exemplarily provides a charge-discharge curve of a button type full battery prepared from lithium iron phosphate $LiFePO_4$ in comparative example 1, as shown in FIG. 4.

It can be seen from the above results that the lithium iron phosphate lithium-rich oxide composite prepared by using the method of the present disclosure has excellent electrochemical performance, such as high specific capacity.

Particularly, it can be seen through results from test example 1, test example 3B and comparative example 1 that the lithium iron phosphate lithium-rich oxide composite obtained by selecting a lithium-rich oxide, especially a $Li_5FeO_4$ or $Li_6CoO_4$ lithium-rich oxide, to be mechanically fused with $LiFePO_4$, particularly selecting $Li_6CoO_4$ to be mechanically fused with $LiFePO_4$, has higher electrochemical performance such as charge-discharge specific capacity.

Particularly, it can be seen through results from test example 3A, test example 4 and comparative examples 2-4 that when the compounding ratio of $LiFePO_4$ to the lithium-rich oxide such as $Li_5FeO_4$ and $Li_6CoO_4$ is particularly controlled to 100:2-15, especially 100:2-10, the electrochemical performance of the obtained lithium iron phosphate lithium-rich oxide composite has higher electrochemical performance such as charge-discharge specific capacity.

Particularly, it can be seen through results from test example 1, comparative example 1 and comparative example 5 that the composite is obtained by using the method of the present disclosure to mechanically fuse the lithium-rich oxide with $LiFePO_4$, and the obtained battery has higher electrochemical performance such as charge-discharge specific capacity. Meanwhile, it can be seen through results from comparative example 5 that compared with the battery obtained by respectively adding $LiFePO_4$ and the lithium-rich oxide into the prepared electrode plate in the process of mixing materials, the battery prepared from the composite of the present disclosure has better electrochemical performance such as specific capacity.

What is claimed is:

1. A method for preparing a lithium iron phosphate lithium-rich oxide composite, the method comprising:

(1) mechanically fusing $LiFePO_4$ with a lithium-rich oxide in a protective gas atmosphere, wherein a weight ratio of the $LiFePO_4$ to the lithium-rich oxide is 100:2-15; and (2) sequentially sieving and demagnetizing the obtained mechanically fused material to obtain the lithium iron phosphate lithium-rich oxide composite.

2. The method according to claim 1, wherein in step (1), the lithium-rich oxide is $Li_5FeO_4$ and/or $Li_6CoO_4$.

3. The method according to claim 1, wherein in step (1), the lithium-rich oxide is $Li_6CoO_4$.

4. The method according to claim 1, wherein in step (1), the weight ratio of the $LiFePO_4$ to the lithium-rich oxide is 100:2-10.

5. The method according to claim 1, wherein in step (1), the conditions of the mechanically fusing comprise: the fusing rate is 300-2500 rpm, and the fusing time is 3-60 min;

preferably, in step (1), the $LiFePO_4$ is mechanically fused with the lithium-rich oxide in an efficient fusing machine.

6. The method according to claim 1, wherein in step (1), the protective gas is nitrogen and/or an inert gas;

preferably, in step (1), the protective gas is nitrogen and/or argon.

7. The method according to claim 1, wherein in step (2), the sieving is vibratory sieving, and the mesh number of a screen for the vibratory sieving is 200-500 meshes;

preferably, in step (2), the magnetic force of an iron remover for the demagnetizing is 5000-12000 GS.

8. A lithium iron phosphate lithium-rich oxide composite prepared by the method according to claim 1.

9. A method for preparing a positive electrode plate of a lithium ion battery, the method comprising:

(a) mechanically fusing $LiFePO_4$ with a lithium-rich oxide in a protective gas atmosphere, wherein a weight ratio of the $LiFePO_4$ to the lithium-rich oxide is 100:2-15;

(b) sequentially sieving and demagnetizing the obtained mechanically fused material to obtain the lithium iron phosphate lithium-rich oxide composite;

(c) mixing the lithium iron phosphate lithium-rich oxide composite, a conductive agent and a binder in the presence of a solvent to obtain positive electrode slurry; and (d) coating the positive electrode slurry onto a current collector foil, and then drying, so as to obtain the positive electrode plate of the lithium ion battery.

10. A lithium ion battery comprising the positive electrode plate of the lithium ion battery prepared by the method according to claim 9.

* * * * *